(12) United States Patent
Tsukuda et al.

(10) Patent No.: US 11,867,071 B1
(45) Date of Patent: Jan. 9, 2024

(54) TURBINE MONITORING SYSTEM AND TURBINE MONITORING METHOD

(71) Applicant: Toshiba Energy Systems & Solutions Corporation, Kawasaki (JP)

(72) Inventors: Tomohiko Tsukuda, Yokohama Kanagawa (JP); Yasuteru Kawai, Yokohama Kanagawa (JP); Yukio Kanehira, Yokohama Kanagawa (JP); Tsuguhisa Tashima, Yokohama Kanagawa (JP)

(73) Assignee: Toshiba Energy Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 18/155,992

(22) Filed: Jan. 18, 2023

(30) Foreign Application Priority Data

Oct. 25, 2022 (JP) .................................. 2022-170998

(51) Int. Cl.
*F01D 21/00* (2006.01)
*F01D 17/08* (2006.01)
(Continued)

(52) U.S. Cl.
CPC ........... *F01D 21/003* (2013.01); *F01D 15/10* (2013.01); *F01D 17/085* (2013.01); *F01D 21/12* (2013.01);
(Continued)

(58) Field of Classification Search
CPC ...... F01D 21/003; F01D 15/10; F01D 17/085; F01D 21/12; F01D 21/14; G01N 17/00;
(Continued)

(56) References Cited

U.S. PATENT DOCUMENTS 10,037,026 B2    7/2018   Shinkle et al.
2013/0089463 A1*  4/2013  Hefner ................. G01N 17/043
                                                             422/53
(Continued)

FOREIGN PATENT DOCUMENTS

JP    S61-207804 A    9/1986
JP    2016-70272 A    5/2016
JP    2021-92175 A    6/2021

OTHER PUBLICATIONS

Hiroshige Itoh et al., Evaluation of Erosion by Liquid Droplet Impingement for Metallic Materials, Transactions of the Japan Society of Mechanical Engineers (A), vol. 59, No. 567 (Nov. 1993), No. 93-0222, pp. 264-269, with English machine translation.

*Primary Examiner* — Hoang M Nguyen
(74) *Attorney, Agent, or Firm* — Foley & Lardner LLP

(57) ABSTRACT

In one embodiment, a turbine monitoring system includes a temperature measurer configured to sense a temperature of steam to be introduced to a steam turbine, and output a sensing result of the temperature. The system further includes an electrical output measurer configured to sense an electrical output of a generator driven by the steam turbine, and output a sensing result of the electrical output. The system further includes a computing module configured to compute an erosion quantity of a moving vane of the steam turbine with water drops, based on the sensing result of the temperature that is output from the temperature measurer and the sensing result of the electrical output that is output from the electrical output measurer. The system further includes an outputting module configured to output information that is based on the erosion quantity computed by the computing module.

15 Claims, 6 Drawing Sheets

(51) Int. Cl.
  *F01D 15/10* (2006.01)
  *G01N 17/00* (2006.01)
  *F01D 21/12* (2006.01)
  *F01D 21/14* (2006.01)
(52) U.S. Cl.
  CPC .............. *F01D 21/14* (2013.01); *G01N 17/00* (2013.01); *F05D 2220/76* (2013.01); *F05D 2260/80* (2013.01); *F05D 2260/95* (2013.01)
(58) Field of Classification Search
  CPC ............. F05D 2220/76; F05D 2260/80; F05D 2260/95
  See application file for complete search history.

(56) References Cited

U.S. PATENT DOCUMENTS

2015/0132127 A1* 5/2015 Salm .................. G01M 5/0033
  416/61
2021/0172343 A1* 6/2021 Tsukuda ................ F01K 13/003

* cited by examiner

TURBINE MONITORING SYSTEM AND TURBINE MONITORING METHOD

CROSS REFERENCE TO RELATED APPLICATION

This application is based upon and claims the benefit of priority from the prior Japanese Patent Application No. 2022-170998, filed on Oct. 25, 2022, the entire contents of which are incorporated herein by reference.

FIELD

Embodiments described herein relate to a turbine monitoring system and a turbine monitoring method.

BACKGROUND

Since in the low pressure stage of a steam turbine used for a power plant, the temperature and the pressure of steam, which is working fluid, go down in the process of the steam expanding, a part of the steam condenses into a moisture component in a steam channel.

FIGS. 5A and 5B are sectional views for explaining a problem of a conventional steam turbine. This steam turbine is exemplarily a low pressure turbine. FIGS. 5A and 5B show different cross sections of the low pressure turbine.

FIGS. 5A and 5B show the final stage, of the low pressure turbine, which is constituted of a pair of sets of stator vanes 1 and moving vanes 2 arranged downstream of the stator vanes 1, and a stator vane 3 and a moving vane 4, in the previous stage to the final stage, which have the same configurations of those. FIGS. 5A and 5B schematically show trajectories of steam and droplets (water drops) in a region including these stator vanes 1 and 3 and moving vanes 2 and 4.

In FIG. 5A, while steam, which is working fluid, traces trajectories as indicated streamlines L1, moisture components occurring until the previous stage to the final stage are in the form of water drops, and fly off along streamlines L2 with centrifugal force from a trailing edge end 5 of the moving vane 4 to a diaphragm outer ring 6 side of the stator vane 1.

When these water drops attach onto the stator vane 1, they flow on the surface of the stator vane 1 toward the tailing edge thereof while forming a water film DL on the surface, and when reaching a trailing edge end 7 of a turbine nozzle, they are put back into water drops to fly off. After that, the water drops collide around a leading edge end 8 of the moving vane 2.

FIG. 5B shows an absolute velocity V1 of the water drops, a relative velocity V2 of the water drops, and a peripheral velocity U of the steam. As shown in FIG. 5B, the absolute velocity V1 of the water drops flying off from the trailing edge end 7 of the stator vane 1 is smaller than the peripheral velocity U of the steam, and they are not to be accelerated enough by the time when they reach the moving vane 2. Therefore, the water drops are to collide against the backside of the leading edge end 8 of the moving vane 2 at the relative velocity V2 close to the peripheral velocity U. This collision between the droplets and the moving vane 2 causes erosion of the leading edge end 8 of the moving vane 2.

FIG. 6 is a graph for explaining the problem of the conventional steam turbine. FIG. 6 shows general relation between an erosion rate ("dE/dt") and an elapsed time ("t"). Periods during which the erosion rate is changing are categorized roughly into four periods of an incubation period, an acceleration period, a deceleration period and a stable period. In the incubation period, although significant decrease in weight does not occur on a material (for example, the moving vanes 2), damage caused by fatigue is being accumulated in the vicinity of the collision surface due to many water drops colliding thereagainst, which results in formation of fatigue cracks. In the acceleration period, the fatigue accumulated inside the material during the incubation period appears as fracture events, which rapidly increases the erosion rate. In the deceleration period, the erosion rate rapidly decreases, and in the stable period, the erosion rate has a certain constant value.

The erosion quantity "E" in the stable period is expressed as a property which linearly changes relative to time "t", for example, by expression (1) below.

$$E = a + bt \tag{1}$$

Herein, "a" is a material property. Differentiating expression (1) by time leads to the erosion rate "dE/dt", which is an erosion quantity "E" per unit time and is expressed by expression (2) below.

$$dE/dt = b \tag{2}$$

Herein, "b" is typically a function of a collision velocity of water drops, a water drop diameter, a water quantity (the number of water drops), and a material property and is expressed, for example, by expression (3) below.

$$b = C1 \times V^{p1} \times d^{q1} \times N \tag{3}$$

Herein, "C1", "p1" and "q1" are material constants, "V" represents the collision velocity, "d" represents the water drop diameter, and "N" represents the number of water drops.

Since erosion of the final stage harmfully affects reliability of the steam turbine, it is desirable to predict the erosion quantity in advance. Therefore, the erosion quantity is predicted in the stage of designing of a steam turbine in general based on the theory as above, the operation states of the steam turbine being supposed.

DETAILED DESCRIPTION

Embodiments will now be explained with reference to the accompanying drawings. In FIGS. 1 to 4 and FIGS. 5A to 6 mentioned above, the same configurations are given the same signs, and duplicated description for those is omitted.

Expanding use of renewable energy in recent years places, on the position of thermal power generation for supply-demand balancing, steam turbines, which are being wanted to be diversely operated (to be operated with partial load and to be suspended). Such diversity in operation then causes properties at the moving vane inlet in the final stage of a steam turbine to fluctuate depending on conditions. It is therefore inferred that the collision velocity and the number of water drops mentioned above also change every hour depending on operations of a plant. One can accordingly consider that this makes the prediction of an erosion quantity difficult in the stage of designing of a steam turbine.

For example, one can consider to radiate light into a steam turbine containing water drops, to receive scattered light from the water drops, and to compute an erosion quantity with water drops based on the light receiving result of the scattered light. There is nevertheless a concern that exposure of a delicate optical device to high temperature steam may cause damage to the optical device over years.

Moreover, one can consider to sense physical quantities (for example, temperatures, pressures, flow rates, and the like) of steam flowing upstream of or downstream of the steam turbine and water obtained from the steam, and to compute the erosion quantity with water drops based on the sensing results of the physical quantities. Nevertheless, when bleeding steam from this steam turbine or another steam turbine, there is a concern that a correct erosion quantity cannot be computed.

In one embodiment, a turbine monitoring system includes a temperature measurer configured to sense a temperature of steam to be introduced to a steam turbine, and output a sensing result of the temperature. The system further includes an electrical output measurer configured to sense an electrical output of a generator driven by the steam turbine, and output a sensing result of the electrical output. The system further includes a computing module configured to compute an erosion quantity of a moving vane of the steam turbine with water drops, based on the sensing result of the temperature that is output from the temperature measurer and the sensing result of the electrical output that is output from the electrical output measurer. The system further includes an outputting module configured to output information that is based on the erosion quantity computed by the computing module.

First Embodiment

Figure 1:
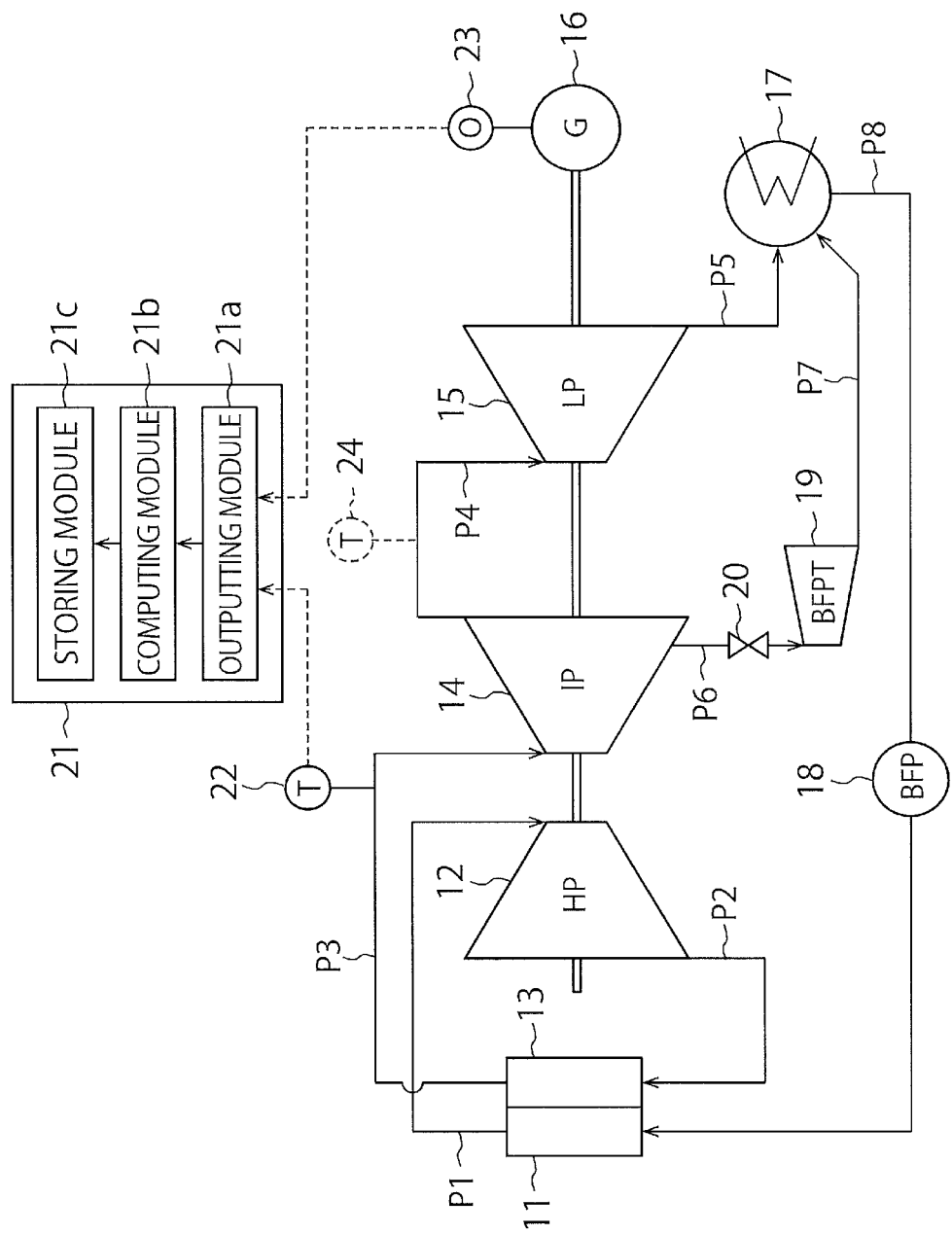
FIG. 1 is a schematic diagram showing a configuration of a steam turbine plant of a first embodiment.

FIG. 1 is a schematic diagram showing a configuration of a steam turbine plant of a first embodiment.

The steam turbine plant in FIG. 1 is a plant of reheat type and includes a boiler 11, a high pressure (HP) turbine 12, a reheater 13, an intermediate pressure (IP) turbine 14, a low pressure (LP) turbine 15, a generator 16, a steam condenser 17, a BFP (Boiler Feed Pump) 18, a BFPT (Boiler Feed Pump Turbine) 19, a BFPT inlet valve 20, steam passages P1 to P5, bleeding passages P6 and P7 and a water supply passage P8. The low pressure turbine 15 is an example of a "steam turbine" of the disclosure, each of the high pressure turbine 12 and the intermediate pressure turbine 14 is an example of "another steam turbine" of the disclosure, and the BFPT 19 is an example of a "turbine" of the disclosure.

The steam turbine plant in FIG. 1 further includes, as components of a turbine monitoring system for monitoring operation of a steam turbine, a turbine monitoring device 21, an inlet temperature measurer 22 and an electrical output measurer 23. The turbine monitoring device 21 includes a storing module 21a, a computing module 21b and an outputting module 21c. An inlet temperature measurer 24 indicated in FIG. 1 with a dotted line is mentioned later.

The boiler 11 heats water to generate steam, and exhausts the steam to the steam passage P1. The high pressure turbine 12 is driven by the steam introduced from the steam passage P1, and exhausts the steam to the steam passage P2. The reheater 13 heats (reheats) the steam introduced from the steam passage P2, and exhausts the steam to the steam passage P3. The intermediate pressure turbine 14 is driven by the steam introduced from the steam passage P3, and exhausts the steam to the steam passage P4. The low pressure turbine 15 is driven by the steam introduced from the steam passage P4, and exhausts the steam to the steam passage P5. The generator 16 is driven by the high pressure turbine 12, the intermediate pressure turbine 14 and the low pressure turbine 15, and thereby, generates electric power.

The steam condenser 17 cools the steam introduced from the steam passage P5 to put it back into water, and exhausts the water (condensed water) to the water supply passage P8. The BFP 18 (boiler feed pump) is provided on the water supply passage P8. The BFP 18 raises a pressure of the water in the water supply passage P8, and transfers the pressure-raised water to the boiler 11. The boiler 11 heats the water (supplied water) introduced from the water supply passage P8 to generate steam, and exhausts the steam to the steam passage P1 as mentioned above. Steam and water circulate in the steam turbine plant as above.

The BFP 18 can be driven by a not-shown electric motor, and can also be driven by the BFPT 19. Therefore, the BFP 18 can be joined to the electric motor and the BFPT 19. When an electrical output of the generator 16 is smaller than a prescribed value, the BFP 18 is driven by the electric motor. When the electrical output of the generator 16 is larger than the prescribed value, the BFP 18 is driven by the BFPT 19. When the BFP 18 is driven by the BFPT 19, an energy quantity consumed in the steam turbine plant can be more reduced and efficiency of the steam turbine plant can be more enhanced than in the case where the BFP 18 is driven by the electric motor.

The BFPT 19 is provided between the bleeding passage P6 and the bleeding passage P7. The BFPT inlet valve 20 is provided on the bleeding passage P6. When the electrical output of the generator 16 becomes larger than the prescribed value, the BFPT inlet valve 20 is opened, and the steam bled from the intermediate pressure turbine 14 flows into the bleeding passage P6. The BFPT 19 is driven by the steam introduced from the bleeding passage P6, and exhausts the steam to the bleeding passage P7. The steam condenser 17 cools the steam introduced from the bleeding passage P7 to put it back to water, and exhausts the water (condensed water) to the water supply passage P8. The bleeding passage P7 joins the steam passage P5 in the steam condenser 17. Therefore, an amount of water exhausted from the steam condenser 17 is the sum of an amount of water obtained from the steam exhausted from the steam passage P5 to the steam condenser 17 and an amount of water obtained from the steam exhausted from the bleeding passage P7 to the steam condenser 17.

The turbine monitoring device 21 is a device for monitoring operation of a steam turbine. An example of the turbine monitoring device 21 is a computer such as a PC (Personal Computer) or a controlling device such as a control panel. For example, the turbine monitoring device 21 controls whether the BFP 18 is driven by the electric motor or driven by the BFPT 19, by making a comparison between the electrical output of the generator 16 and the prescribed value. Details of the turbine monitoring device 21 are mentioned later.

The inlet temperature measurer 22 senses a temperature of the steam to be introduced to the intermediate pressure turbine 14, and outputs the sensing result of the temperature to the turbine monitoring device 21. Specifically, the inlet temperature measurer 22 is provided on an inlet pipe (steam passage P3) installed upstream of the initial stage stator vanes of the intermediate pressure turbine 14, and senses the temperature of the steam at an inlet of the intermediate pressure turbine 14. After exhausted from the intermediate pressure turbine 14, the steam is also introduced to the low pressure turbine 15. The inlet temperature measurer 22 includes a thermocouple, for example, and outputs a thermoelectromotive current from the hot contact of the thermocouple installed in a flow field for measuring the temperature to the storing module 21a through a line (for example, a compensation lead wire). The inlet of the intermediate pressure turbine 14 is an inlet of the initial turbine stage.

The electrical output measurer 23 senses the electrical output of the generator 16, and outputs the sensing result of the electrical output to the turbine monitoring device 21. As mentioned later, the turbine monitoring device 21 computes an erosion quantity of moving vanes of the low pressure turbine 15 with water drops based on the aforementioned sensing result of the temperature and the aforementioned sensing result of the electrical output. Moreover, the turbine monitoring device 21 controls whether the BFP 18 is driven by the electric motor or driven by the BFPT 19 based on the aforementioned sensing result of the electrical output. In the latter case, the sensing result of the electrical output is used for making a comparison between the electrical output and the prescribed value.

The storing module 21a stores the sensing result of the inlet steam temperature that is output from the inlet temperature measurer 22 and the sensing result of the electrical output that is output from the electrical output measurer 23. When the low pressure turbine 15 is operated, the storing module 21a of the present embodiment receives the output signal (thermoelectromotive current) from the inlet temperature measurer 22 and the output signal from the electrical output measurer 23 via an inputting and outputting module of the turbine monitoring device 21, and calculates averages of these output signals over a certain fixed operation time to output them to the computing module 21b.

The computing module 21b computes the erosion quantity of the moving vanes of the low pressure turbine 15 with water drops based on the sensing result of the inlet steam temperature that is output from the inlet temperature measurer 22 and the sensing result of the electrical output that is output from the electrical output measurer 23. The computing module 21b of the present embodiment computes the erosion quantity of the moving vanes 2 (refer to FIGS. 5A and 5B) in the final stage of the low pressure turbine 15 with water drops based on the signals output from the storing module 21a. The computing module 21b is implemented, for example, with a processor and a computer program, and the computer program executed by the processor computes the erosion quantity based on signals and various data from the storing module 21a.

The outputting module 21c outputs information based on the erosion quantity computed by the computing module 21b. The outputting module 21c displays such information, for example, on a display such as an LCD (Liquid Cristal Display) or indicators such as lamps. The outputting module 21c may display the information on a display or indicators of the turbine monitoring device 21 or may display the information on a display or indicators of another device connected to the turbine monitoring device 21 in a wired manner or a wireless manner.

The outputting module 21c of the present embodiment displays the erosion quantity or a warning based on the erosion quantity as the information. When displaying the erosion quantity, the outputting module 21c may display the erosion quantity computed by the computing module 21b in numerical values or may display the erosion quantity computed by the computing module 21b on a graph or a table. In such cases, the outputting module 21c may display the erosion quantity along with a reference value, for the erosion quantity, which is prestored in the turbine monitoring device 21 or in another device. Thereby, an administrator of the turbine monitoring system, for example, can be prompted to repair or replace moving vanes. Moreover, when the erosion quantity exceeds the reference value, the outputting module 21c may display a warning for prompting the administrator of the turbine monitoring system to repair or replace moving vanes on the display or the indicators. Examples of the warning include a message displayed on the display, and lighting a red lamp of the indicators.

The outputting module 21c may output the information in various modes other than displaying. For example, the information may be stored in a storage, may be distributed as an email, or may be transmitted via a network.

The turbine monitoring system of the present embodiment monitors, as the steam turbine, the low pressure turbine 15. The reason is that the low pressure turbine 15 generally causes a problem of occurrence of erosion since the condition of steam becomes wet steam in turbine stages on its downstream side. It should be noted that the turbine monitoring system of the present embodiment may monitor a steam turbine other than the low pressure turbine 15.

The low pressure turbine 15 receives introduction of the steam from the steam passage P4. The steam from which expansion work has been taken out in the turbine stages of the low pressure turbine 15 passes through an exhaust chamber provided on the downstream side of the moving vanes 2 in the final stage of the low pressure turbine 15 and is exhausted to the steam passage P5. The steam exhausted to the steam passage P5 is introduced to the steam condenser 17 and put back into water. The low pressure turbine 15 is connected to the generator 16 as well as the high pressure turbine 12 and the intermediate pressure turbine 14 with a rotary shaft, and expansion work of the steam in these turbines is taken out as electric output of the generator 16.

Figure 2:
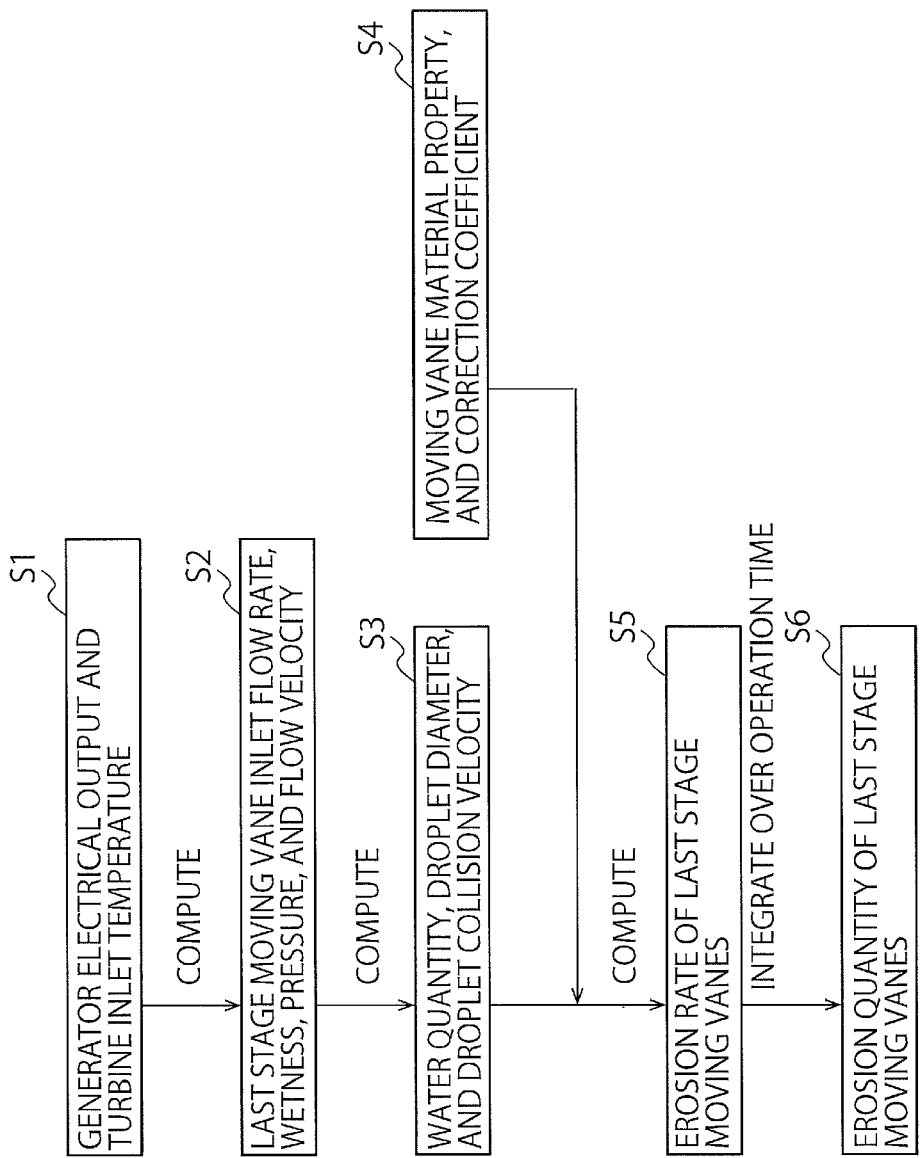
FIG. 2 is a flowchart for explaining operation of a turbine monitoring system of the first embodiment.

FIG. 2 is a flowchart for explaining operation of the turbine monitoring system of the first embodiment. FIG. 2 shows a flow of computations by the computing module 21b.

First, based on the generator electrical output and the turbine inlet temperature (S1) input from the storing module 21a, there are computed a flow rate, a wetness, a pressure and a flow velocity (S2) of steam at the last stage moving vane inlet of the low pressure turbine 15. In the present embodiment, a program for fluid analysis or one-dimensional steam calculation may be stored in the computing module 21b to calculate the flow rate, the wetness, the pressure and the flow velocity at the last stage moving vane inlet with the electrical output and the inlet temperature set as inputs. Moreover, in the present embodiment, in order to reduce calculation capacity and load on the computing module 21b, the fluid analysis or the one-dimensional steam calculation on conditions supposed in actual operation may be performed comprehensively in advance to prestore relations between inputs and outputs thereto/therefrom above as approximation functions.

Next, from the flow rate, the wetness, the pressure and the flow velocity at the last stage moving vane inlet, there are next computed a water quantity (the number of water drops), a water drop diameter and a water drop collision velocity (S3) in the steam at the last stage moving vane inlet. The water quantity is calculated based on the aforementioned flow rate and wetness. The water drop diameter "D" is calculated using the pressure "ρ", the flow velocity "W" and a Weber number "Weσ" by expression (4) below.

$$D = We\sigma/(\rho W^2) \quad (4)$$

The Weber number "Weσ" is a dimensionless number representing a ratio between inertia of steam and surface tension of water drops. The higher the pressure "ρ" is, the smaller the water drop diameter "D" is.

The collision velocity of water drops is calculated through trajectory calculation on the water drops from the aforementioned flow velocity and water drop diameter. Since as the water drop diameter is larger, the water drops are more scarcely accelerated with the steam and a difference in velocity between the steam and the water drops is larger, the collision velocity of the water drops against the moving vanes becomes higher. In the present embodiment, a trajectory analysis program on water drops may be stored in the computing module 21b to calculate the collision velocity of the water drops. Moreover, in the present embodiment, in order to reduce calculation capacity and load on the computing module 21b, the trajectory calculation on conditions supposed in actual operation may be comprehensively performed to prestore relations between inputs and outputs thereto/therefrom above as approximation functions in the computing module 21b.

Meanwhile, a material property and a correction coefficient (S4) of the last stage moving vanes are prestored in the computing module 21b. From the water drop collision velocity, the water quantity, the water drop diameter, the moving vane material property and the correction coefficient, the erosion rate "dE/dt" (S5), of the last stage moving vanes, which is expressed by expression (2) is evaluated, and then, the erosion quantity "ΔE" for a certain time range "Δt" is calculated using expression (5) below.

$$\Delta E = dE/dt \times \Delta t \quad (5)$$

The erosion quantity "E" (S6) is calculated based on the erosion rate "dE/dt". Specifically, the erosion quantity "E" is calculated by integrating "ΔE" computed using expression (5) over the operation time of the steam turbine plant. Namely, the erosion quantity "E" is calculated by integrating the erosion rate "dE/dt". Thereby, the erosion quantity "E" of the last stage which the operation of the low pressure turbine 15 until the present is reflected on can be evaluated. Since the erosion rate "dE/dt" largely varies depending on the electrical output of the generator 16 and the inlet steam temperature of the low pressure turbine 15, "Δt" may be appropriately set depending on the frequency of change in properties of the generator 16 and the low pressure turbine 15, and thereby, evaluation accuracy of the erosion quantity "E" can be enhanced.

Herein, advantages of the turbine monitoring system of the present embodiment are described.

As mentioned above, expanding use of renewable energy in recent years strongly places, on the position of thermal power generation for supply-demand balancing, steam turbines, which are being wanted to be diversely operated (to be operated with partial load and to be suspended). Such diversity in operation causes properties at the moving vane inlet in the final stage of a steam turbine to fluctuate depending on conditions. It is therefore inferred that the collision velocity and the number of water drops mentioned above change every hour depending on operations of a plant. One can accordingly consider that this makes the prediction of an erosion quantity difficult in the stage of designing of a steam turbine.

Therefore, in the present embodiment, the erosion quantity is calculated by computing the erosion rate of the last stage moving vanes in real time during operation of a turbine plant and integrating the erosion rate over the operation time thereof, in response to plant operation changing every time. Hence, according to the present embodiment, it is possible to evaluate the erosion quantity, of the last stage moving vanes, which the actual operation is reflected on with high accuracy. It is thereby possible to properly detect and/or predict the replacement timing and/or the repairing timing of the last stage, so that vanes can be prevented from coming apart due to erosion to improve reliability of the plant.

The BFP 18 of the present embodiment is driven by the electric motor when the electrical output of the generator 16 is smaller than the prescribed value, and is driven by the BFPT 19 when the electrical output of the generator 16 is larger than the prescribed value. In the former case, the BFPT inlet valve 20 is closed, and it stops bleeding the intermediate pressure turbine 14. In the latter case, the BFPT inlet valve 20 is opened, and the intermediate pressure turbine 14 is bled. One can consider that the diversity in operation causes the electrical output of the generator 16 to vary widely and switching between the former state and the latter state to occur in high frequency. One accordingly thinks that a flow rate of steam passing through the last stage moving vanes of the low pressure turbine 15 also discontinuously varies frequently depending on the operations of the plant.

It can be, for example, considered to calculate the erosion rate of the last stage moving vanes based on a temperature of steam to be introduced to the low pressure turbine 15 and a flow rate of water obtained from steam exhausted from the low pressure turbine 15. This makes it possible to estimate the flow rate of the steam that passes through the last stage moving vanes based on the flow rate of the water. In this case, the flow rate of the water can be measured by sensing a flow rate of water in the water supply passage P8 with a flow rate measurer. Nevertheless, when the intermediate pressure turbine 14 is bled, the water in the water supply passage P8 is to include water obtained from steam bled from the intermediate pressure turbine 14 as well as the water obtained from the steam that is exhausted from the low pressure turbine 15. In this case, the flow rate of the steam that passes through the last stage moving vanes cannot be estimated with high accuracy, and the erosion rate cannot be calculated with high accuracy.

Otherwise, it can be considered to calculate the erosion rate of the last stage moving vanes based on the temperature of the steam that is to be introduced to the low pressure turbine 15 and a pressure of the steam that is to be introduced to the low pressure turbine 15. This makes it possible to estimate the flow rate of the steam that passes through the last stage moving vanes based on the pressure of the steam. Nevertheless, also in this case, there are a concern that estimation accuracy of the flow rate of the steam becomes worse due to the bleeding, and consequently, a concern that calculation accuracy of the erosion rate becomes worse.

Therefore, in the present embodiment, the erosion rate of the last stage moving vanes is calculated based on the temperature of the steam that is to be introduced to the low pressure turbine 15 and the electrical output of the generator 16. This makes it possible to estimate, based on the electrical output, the flow rate of the steam that passes through the last stage moving vanes. In this case, as the quantity of the steam bled from the intermediate pressure turbine 14 is varying, the electrical output of the generator 16 is varying depending on the quantity of the bled steam. Consequently, the flow rate of the steam passing through the last stage moving vanes can be estimated in consideration of the bleeding. Therefore, the present embodiment makes it possible to estimate the flow rate of the steam passing through the last stage moving vanes with high accuracy even when bleeding is performed, and makes it possible to calculate the erosion rate with high accuracy.

Hereafter, various modifications of the turbine monitoring system of the present embodiment are described. The description below can also apply to a second embodiment mentioned later.

While in the present embodiment, the erosion quantity "E" is calculated by integrating the erosion rate "dE/dt", the erosion quantity "E" may be calculated by other methods. For example, the erosion quantity "E" may be calculated from the erosion rate "dE/dt" by another method other than integration, or the erosion quantity "E" may be calculated without calculating the erosion rate "dE/dt" from the generator electrical output and the turbine inlet temperature.

Moreover, the inlet temperature measurer 22 of the present embodiment may be replaced by the inlet temperature measurer 24 shown in FIG. 1. The inlet temperature measurer 24 senses the temperature of the steam to be introduced to the low pressure turbine 15, and outputs the sensing result of the temperature to the turbine monitoring device 21. Specifically, the inlet temperature measurer 24 is provided on an inlet pipe (steam passage P4) installed upstream of the initial stage stator vanes of the low pressure turbine 15, and senses the temperature of the steam at an inlet of the low pressure turbine 15. The inlet temperature measurer 24 includes a thermocouple, for example, and outputs a thermoelectromotive current from the hot contact of the thermocouple installed in a flow field for measuring the temperature to the storing module 21a through a line (for example, a compensation lead wire). The inlet of the low pressure turbine 15 is an inlet of the initial turbine stage.

Moreover, the bleeding passage P6 of the present embodiment may be connected to the low pressure turbine 15 or the high pressure turbine 12, not to the intermediate pressure turbine 14. In this case, the bleeding passage P6 bleeds steam from the low pressure turbine 15 or the high pressure turbine 12.

As above, in the present embodiment, the erosion quantity of the moving vanes of the low pressure turbine 15 is computed based on the sensing results output from the inlet temperature measurer 22 and the electrical output measurer 23, and information based on the computed erosion quantity is output. Therefore, the present embodiment makes it possible to evaluate the erosion quantity of the moving vanes of the low pressure turbine 15 appropriately. For example, the present embodiment makes it possible to evaluate the erosion quantity of the last stage moving vanes of the low pressure turbine 15 with high accuracy even when steam is bled from any of the steam turbines.

Hereafter, a steam turbine plant of the second embodiment is described. In the description below, its differences from the steam turbine plant of the first embodiment are mainly described and description of the matters common to it and the steam turbine plant of the first embodiment is omitted.

Second Embodiment

Figure 3:
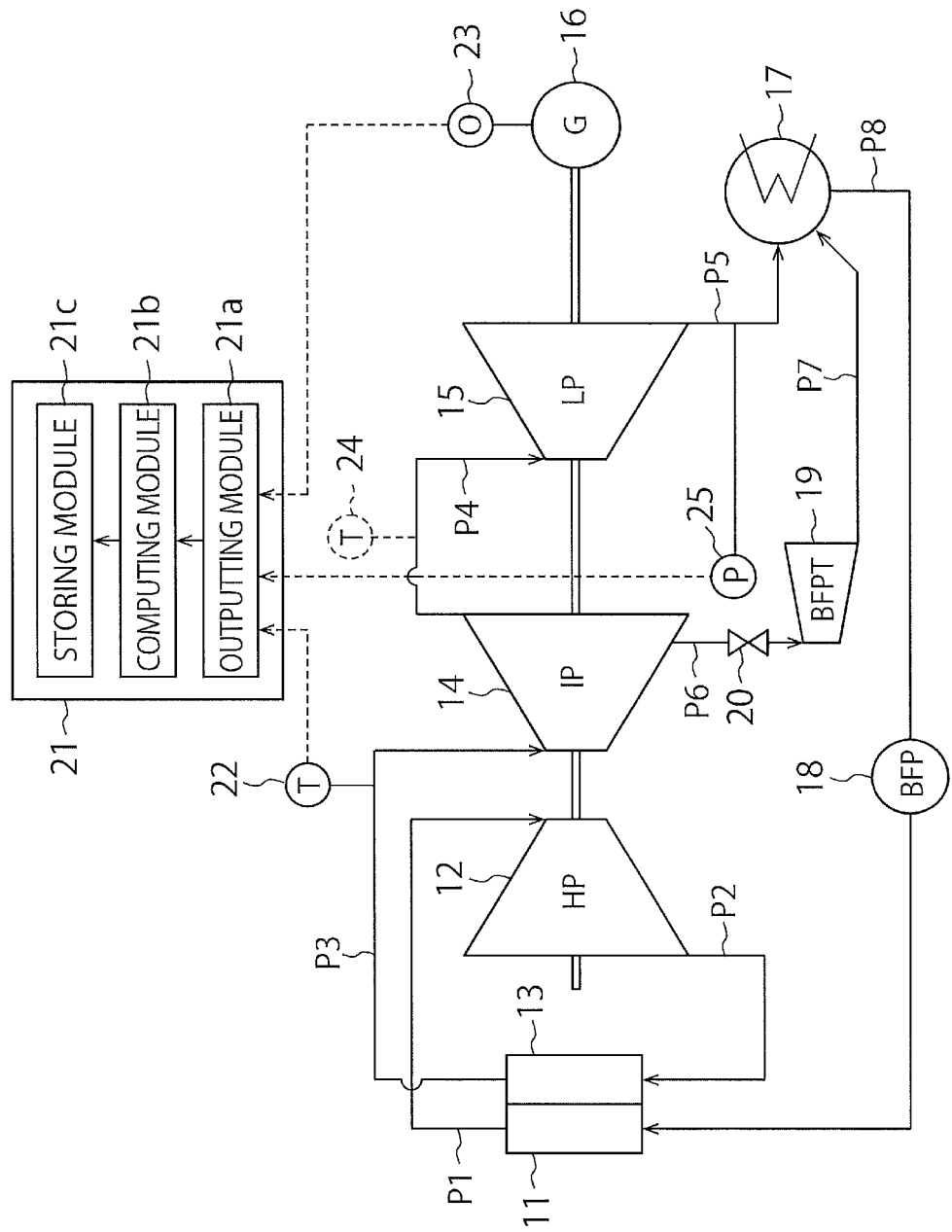
FIG. 3 is a schematic diagram showing a configuration of a steam turbine plant of a second embodiment.

FIG. 3 is a schematic diagram showing a configuration of the steam turbine plant of the second embodiment.

The steam turbine plant in FIG. 3 is a plant of reheat type and includes an outlet pressure measurer 25 in addition to the constituents shown in FIG. 1.

The outlet pressure measurer 25 senses a pressure of the steam exhausted from the low pressure turbine 15, and outputs the sensing result of the pressure to the turbine monitoring device 21. Specifically, the outlet pressure measurer 25 is provided on an outlet pipe (steam passage P5) installed downstream of the last stage moving vanes of the low pressure turbine 15, and senses the pressure of the steam at an outlet of the low pressure turbine 15. The outlet pressure measurer 25 includes a pressure conduit and a pressure sensor, for example, senses a pressure from the pressure conduit installed in a flow field for measuring the pressure with the pressure sensor, and outputs an output signal indicating the sensed pressure to the storing module 21a. The outlet of the low pressure turbine 15 is an outlet of the last turbine stage.

The storing module 21a stores the sensing result of the inlet steam temperature that is output from the inlet temperature measurer 22, the sensing result of the electrical output that is output from the electrical output measurer 23, and the sensing result of the outlet steam pressure that is output from the outlet pressure measurer 25. When the steam turbines are operated, the storing module 21a of the present embodiment receives the output signal (thermoelectromotive current) from the inlet temperature measurer 22, the output signal from the electrical output measurer 23, and the output signal from the outlet pressure measurer 25 via an inputting and outputting module of the turbine monitoring device 21, and calculates averages of these output signals over a certain fixed operation time to output them to the computing module 21b.

The computing module 21b computes the erosion quantity of the moving vanes of the low pressure turbine 15 with water drops based on the sensing result of the inlet steam temperature that is output from the inlet temperature measurer 22, the sensing result of the electrical output that is output from the electrical output measurer 23, and the sensing result of the outlet steam pressure that is output from the outlet pressure measurer 25. The computing module 21b of the present embodiment computes the erosion quantity of the moving vanes 2 in the final stage of the low pressure turbine 15 (refer to FIGS. 5A and 5B) with water drops based on the signals output from the storing module 21a. The computing module 21b is implemented, for example, with a processor and a computer program, and the computer program executed by the processor computes the erosion quantity based on signals and various data from the storing module 21a.

As in the case of the first embodiment, the outputting module 21c outputs information based on the erosion quantity computed by the computing module 21b.

Figure 4:
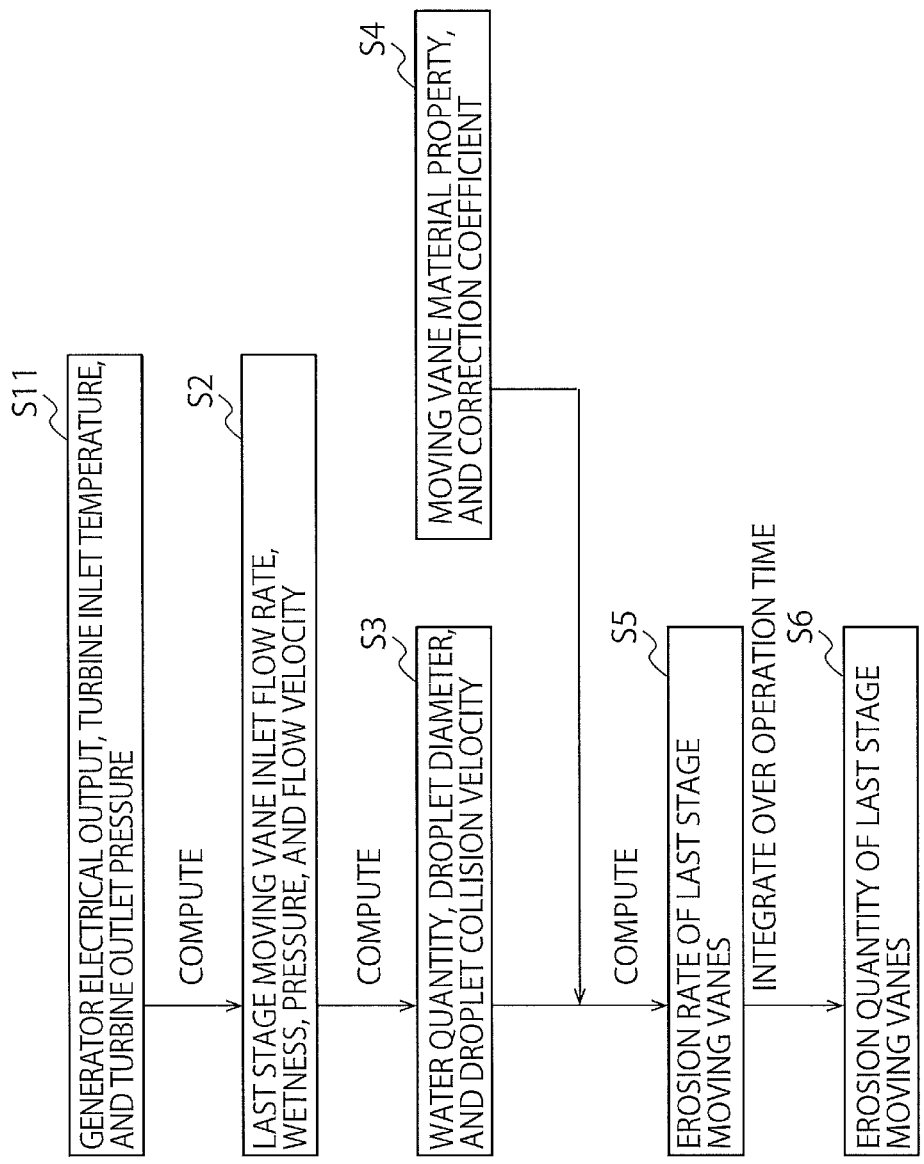
FIG. 4 is a flowchart for explaining operation of a turbine monitoring system of the second embodiment.
Figure 5B:
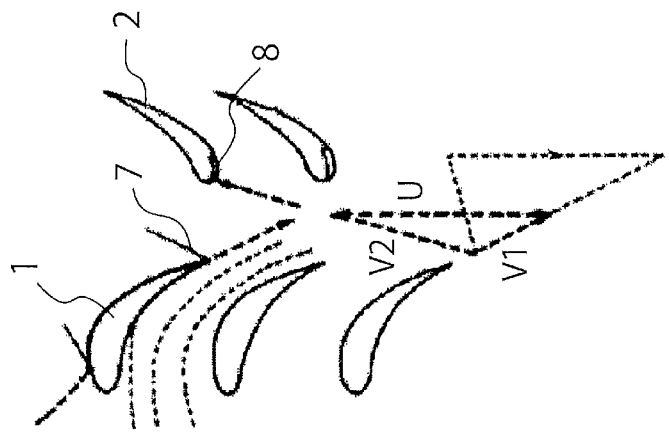
FIGS. 5A and 5B show sectional views for explaining a problem of a conventional steam turbine.
Figure 5A:
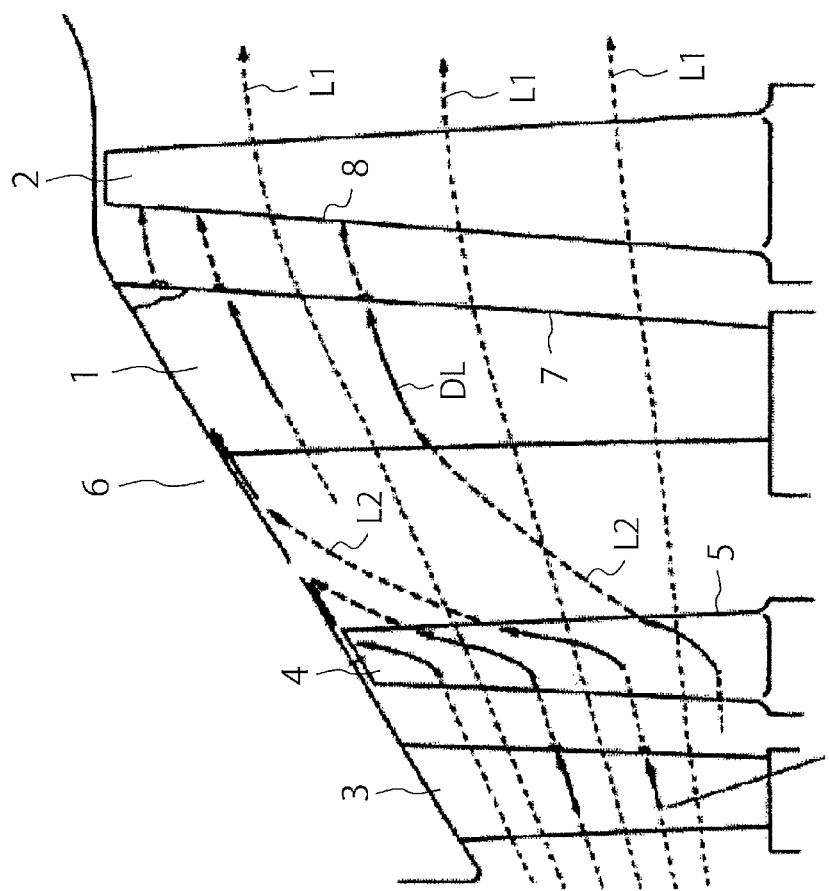
Figure 6:
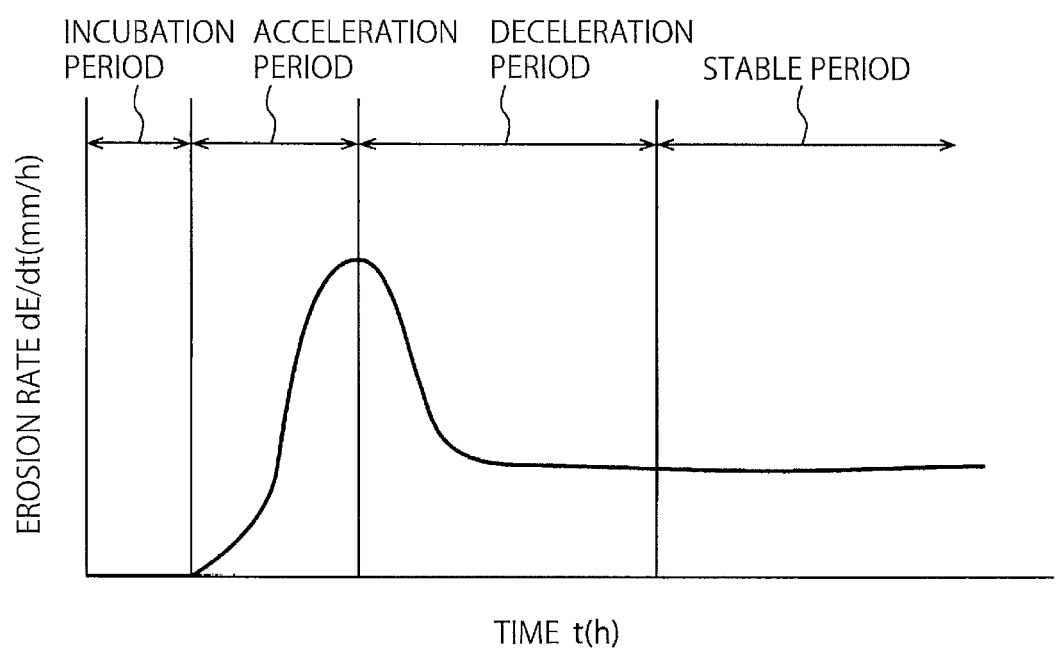
FIG. 6 is a graph for explaining the problem of the conventional steam turbine.

FIG. 4 is a flowchart for explaining operation of a turbine monitoring system of the second embodiment. FIG. 4 shows a flow of computations by the computing module 21b.

The flow of computations in FIG. 4 is similar to the flow of computations in FIG. 2. It should be noted that in the present embodiment, based on the generator electrical output, the turbine inlet temperature and the turbine outlet pressure (S11) input from the storing module 21a, there are computed the flow rate, the wetness, the pressure and the flow velocity (S2) of steam at the last stage moving vane inlet of the low pressure turbine 15. In the present embodiment, a program for fluid analysis or one-dimensional steam calculation may be stored in the computing module 21b to calculate the flow rate, the wetness, the pressure and the flow velocity at the last stage moving vane inlet with the electrical output, the inlet temperature and the outlet pressure set as inputs. Moreover, in the present embodiment, in order to reduce calculation capacity and load on the computing module 21b, the fluid analysis or the one-dimensional steam calculation on conditions supposed in actual operation may be performed comprehensively in advance to prestore relations between inputs and outputs thereto/therefrom above as approximation functions.

A smaller vapor pressure (turbine outlet pressure) at the outlet of the low pressure turbine 15 leads to larger expansion work of the steam of the low pressure turbine 15. Therefore, such a smaller vapor pressure at the outlet of the low pressure turbine 15 leads to a larger electrical output of the generator 16 (generator electrical output) even when a steam flow rate at the outlet of the low pressure turbine 15 does not change. In other words, the steam flow rate required for obtaining a certain generator electrical output is smaller as the turbine outlet pressure is smaller. The present embodiment makes it possible to reflect such a feature of the generator electrical output on calculation of the erosion quantity by calculating the erosion quantity in consideration of the turbine outlet pressure.

As above, in the present embodiment, the erosion quantity of the moving vanes of the low pressure turbine 15 is computed based on the sensing results output from the inlet temperature measurer 22, the electrical output measurer 23 and the outlet pressure measurer 25, and information based on the computed erosion quantity is output. Therefore, the present embodiment makes it possible to evaluate the erosion quantity of the moving vanes of the low pressure turbine 15 appropriately. For example, the present embodiment makes it possible to evaluate the erosion quantity of the last stage moving vanes of the low pressure turbine 15 with high accuracy even when steam is bled from any of the steam turbines. Moreover, the present embodiment makes it possible to improve evaluation accuracy for the erosion quantity of the last stage moving vanes of the low pressure turbine 15 by calculating the erosion quantity in consideration of the sensing result output from the outlet pressure measurer 25.

While certain embodiments have been described, these embodiments have been presented by way of example only, and are not intended to limit the scope of the inventions. Indeed, the novel systems and methods described herein may be embodied in a variety of other forms; furthermore, various omissions, substitutions and changes in the form of the systems and methods described herein may be made without departing from the spirit of the inventions. The accompanying claims and their equivalents are intended to cover such forms or modifications as would fall within the scope and spirit of the inventions.

The invention claimed is:

1. A turbine monitoring system comprising:
a temperature measurer configured to sense a temperature of steam to be introduced to a steam turbine, and output a sensing result of the temperature;
an electrical output measurer configured to sense an electrical output of a generator driven by the steam turbine, and output a sensing result of the electrical output;
a computing module configured to compute an erosion quantity of a moving vane of the steam turbine with water drops, based on the sensing result of the temperature that is output from the temperature measurer and the sensing result of the electrical output that is output from the electrical output measurer; and
an outputting module configured to output information that is based on the erosion quantity computed by the computing module.

2. The system of claim 1, wherein the computing module computes an erosion rate that is the erosion quantity of the moving vane with the water drops per unit time and computes the erosion quantity, based on the erosion rate.

3. The system of claim 2, wherein the computing module computes the erosion quantity by integrating the erosion rate over an operation time of the steam turbine.

4. The system of claim 1, wherein the computing module computes the erosion quantity of the moving vane in a final stage of the steam turbine with the water drops.

5. The system of claim 1, wherein the outputting module displays the information that is based on the erosion quantity computed by the computing module.

6. The system of claim 5, wherein the outputting module displays the erosion quantity or a warning that is based on the erosion quantity.

7. The system of claim 1, further comprising a pressure measurer configured to senses a pressure of steam exhausted from the steam turbine,
wherein the computing module computes the erosion quantity, based on the sensing result of the temperature that is output from the temperature measurer, the sensing result of the electrical output that is output from the electrical output measurer, and a sensing result of the pressure that is output from the pressure measurer.

8. The system of claim 1, wherein the steam turbine is provided in a plant including a high pressure turbine, an intermediate pressure turbine and a low pressure turbine that drive the generator, and the steam turbine is the low pressure turbine.

9. The system of claim 8, wherein the temperature measurer senses the temperature of the steam in a steam passage between the high pressure turbine and the intermediate pressure turbine.

10. The system of claim 8, wherein the temperature measurer senses the temperature of the steam in a steam passage between the intermediate pressure turbine and the low pressure turbine.

11. The system of claim 1, further comprising a bleeding passage configured to bleed steam from the steam turbine or another steam turbine that drives the generator.

12. The system of claim 11, wherein the bleeding passage exhausts the bled steam to a steam condenser.

13. The system of claim 12, further comprising:
a boiler configured to generate the steam to be introduced to the steam turbine; and
a boiler feed pump provided on a water supply passage from the steam condenser to the boiler, wherein the bleeding passage is provided with a turbine configured to be driven by the bled steam, operate the boiler feed pump to raise a pressure of water from the steam condenser, and feed the pressure-raised water to the boiler.

14. A turbine monitoring method comprising:

sensing a temperature of steam to be introduced to a steam turbine by a temperature measurer, and outputting a sensing result of the temperature from the temperature measurer;

sensing an electrical output of a generator driven by the steam turbine by an electrical output measurer, and outputting a sensing result of the electrical output from the electrical output measurer;

computing an erosion quantity of a moving vane of the steam turbine with water drops by a computing module, based on the sensing result of the temperature that is output from the temperature measurer and the sensing result of the electrical output that is output from the electrical output measurer; and outputting information by an outputting module, the information being based on the erosion quantity computed by the computing module.

15. The method of claim 14, further comprising sensing a pressure of steam exhausted from the steam turbine by a pressure measurer, wherein the erosion quantity is computed by the computing module, based on the sensing result of the temperature that is output from the temperature measurer, the sensing result of the electrical output that is output from the electrical output measurer, and a sensing result of the pressure that is output from the pressure measurer.

* * * * *